Oct. 22, 1940.  D. L. McNEAL  2,218,619
VEHICLE BRAKE CONTROL MEANS
Filed Aug. 31, 1939
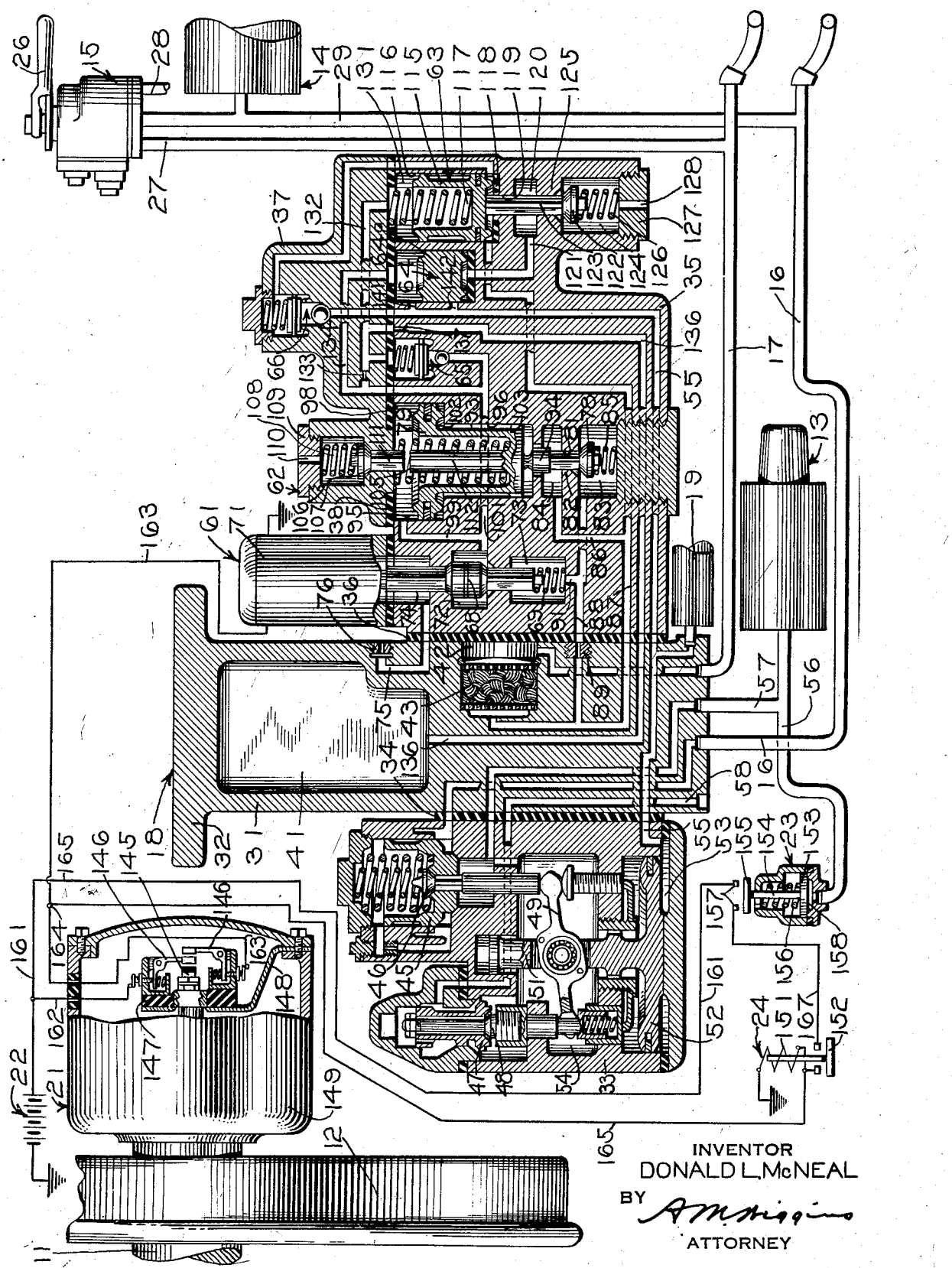
INVENTOR
DONALD L. McNEAL
BY *A. M. Higgins*
ATTORNEY Patented Oct. 22, 1940

2,218,619

UNITED STATES PATENT OFFICE 2,218,619

VEHICLE BRAKE CONTROL MEANS

Donald L. McNeal, Wilkinsburg, Pa., assignor to The Westinghouse Air Brake Company, Wilmerding, Pa., a corporation of Pennsylvania Application August 31, 1939, Serial No. 292,833

9 Claims. (Cl. 303—21)

This invention relates to vehicle brake control means of the type adapted to automatically effect a rapid release of the brakes on a vehicle wheel that begins to slip so as to prevent sliding of the wheel.

As is well known, the application of the brakes on a vehicle wheel to a degree sufficient to exceed the limit of rolling friction or adhesion between the wheel and the road-surface or rail causes the wheel to decelerate rapidly to a locked or non-rotative state and slide.

In describing my present invention, the term "slide" refers to the dragging of a vehicle wheel along a road surface or a rail in a locked or non-rotative state. The term "slip" is employed herein to designate the rotation of a vehicle wheel at a speed less than a rotative speed corresponding to the speed of travel of the vehicle at a given instant. The two terms "slip" and "slide" as employed herein thus refer to two different and distinct conditions of a vehicle wheel and the distinction should be borne in mind.

It is desirable to prevent a vehicle wheel, particularly the wheels of a railway car or train, from sliding because the wheel develops flat spots necessitating replacement or repair of the wheel. Various types of automatic brake control devices have accordingly been devised for the purpose of preventing the sliding of vehicle or car wheels. Typical of one type of equipment devised for preventing the sliding of car wheels is that described and claimed in the copending application Serial No. 221,951 of Clyde C. Farmer, filed July 29, 1938, and assigned to the assignee of this application.

The equipment disclosed in the above-mentioned copending application includes a rotary inertia device that is operatively responsive to the rate of deceleration and acceleration of a vehicle wheel and effective to control a brake control valve mechanism. The valve mechanism is so constructed and arranged as to instantly and rapidly initiate the release of the brakes on a wheel that begins to slip and to continue such release until such time as the degree of the application, exemplified by brake cylinder pressure, reduces below a certain uniform low value and then effect reapplication of the brakes, that is, the resupply of fluid under pressure to the brake cylinder at a restricted rate so as to minimize the possibility of a series of recurrent slipping cycles.

It is an object of my present invention to provide a brake control equipment of the type disclosed in the above-mentioned copending application and further characterized by means for insuring a reapplication of the brakes after the elapse of a certain uniform time interval following the instant that a vehicle wheel begins to slip.

It is another object of my invention to provide a brake control system of the type indicated in the foregoing object wherein a novel arrangement is provided for causing the degree of application of the brakes to be reduced below a certain degree in response to initiation of a wheel-slip condition before enabling reapplication of the brakes to an increased degree to occur.

The above objects as well as other objects of my invention which will be made apparent hereinafter, are attained by an illustrative embodiment subsequently to be described and shown in the single figure of the accompanying drawing.

Description of equipment

Referring to the single figure of the drawing, the equipment is shown in diagrammatic form and, for simplicity, is illustrated in connection with a single wheel-and-axle assembly of the conventional railway type having a pair of wheels 12 fixed at opposite ends of a connecting axle 11. In the drawing, only one end of the axle 11 and the car wheel 12 at that end are shown.

The apparatus comprising my invention includes a brake cylinder 13 for operating the brakes associated with the wheel 12, a source of fluid under pressure such as a reservoir 14 hereinafter referred to as the main reservoir, a manually operative self-lapping type of brake valve 15, a pair of train pipes 16 and 17 hereinafter referred to as the supply pipe and control pipe respectively, a control valve mechanism 18 embodying certain features of my invention, a volume reservoir 19 associated with the valve mechanism 18, a wheel-slip responsive device 21 associated with the wheel-and-axle assembly including the axle 11 and wheel 12, a source of electric supply such as a storage battery 22, a pressure switch 23 and a self-holding or "stick" relay 24.

Considering the parts of the apparatus in greater detail, the self-lapping brake valve 15 is of the well-known type disclosed and claimed in Patent 2,042,112 to Ewing K. Lynn and Rankin J. Bush and requires no specific description thereof. Briefly, however, the brake valve 15 comprises an operating handle 26 effective to move a rotary operating shaft not shown that in turn effects operation of suitable valve mechanism. In the normal or release position of the operating handle 26, the control pipe 17 which is connected to the brake valve 15 by a branch pipe 27 is vented to atmosphere through an exhaust port and pipe 28 of the brake valve. When the operating handle 26 is shifted in one direction from its normal release position into a so-called application zone, the valve mechanism of the brake valve device 15 is operated to supply fluid under pressure from a branch pipe 29 of the supply pipe 16 that is charged with fluid under pressure from the main reservoir 14, to the pipe 27 and control pipe 17, the brake valve being automatically self-lapping and effective to establish a pressure in the control pipe 17 corresponding substantially to the degree of displacement of the operating handle out of its normal position.

If for some reason the pressure in the control pipe reduces, the valve mechanism of the brake valve device 15 is effective to continue the supply of fluid under pressure to the control pipe to maintain a pressure therein corresponding to the position of the operating handle.

It will be understood that in the application of my invention to a train brake equipment the supply pipe 16 and the control pipe 17 extend throughout the length of the train from car to car.

The control valve mechanism 18 is shown in extended form in a single plane but it will be understood that this is for the purpose of aiding in the comprehension of the relation of parts. In practice, the construction is such that parts shown in a single plane are in different planes to secure greater compactness and minimum size of casing.

The valve mechanism 18 may comprise a casing made up of a plurality of separate sections suitably secured together by screws or bolts not shown. As shown, the casing of the valve mechanism 18 comprises a pipe bracket section 31 having a flange 32 adapted to be secured, as by a plurality of bolts or screws not shown, to a convenient portion of the vehicle frame. The casing of the valve mechanism further comprises a relay valve section 33 secured to one face of the pipe bracket section 31 with an intervening sealing gasket 34 therebetween and a main body section 35 secured to the opposite face of the pipe bracket section with an intervening gasket 36 therebetween. Attached to the main body section 35 is a cover section 37 with a gasket 38 interposed therebetween.

Formed in the pipe bracket section 31 is a volume reservoir 41, the purpose of which will be made apparent hereinafter, a bore or chamber 42 in which is contained a filter or strainer 43, and various communicating passages hereafter described.

The arrangement is such that all pipe connections to the valve mechanism 18 are made at the pipe bracket section 31. Thus the relay valve section 33 and the main body section 35 may be severally removed from the pipe bracket section 31 without disturbing the pipe connections to the valve mechanism.

The relay valve mechanism embodied in the relay casing section 33 is of the super-sensitive high-capacity type disclosed and claimed in Patent 2,096,491 to Ellis E. Hewitt and in itself is not my invention. Briefly, the relay valve mechanism comprises a main supply valve 45, a pilot supply valve 46, a main release valve 47 and a pilot release valve 48, which valves are operated by means of operating lever 49 pivoted at a point between the ends thereof on the stem 51 of an operating piston 52.

Formed at one side of the operating piston 52 is a control chamber 53 and on the opposite side of the piston 52 a pressure chamber 54.

When fluid under pressure is supplied to the control chamber 53 through a passage 55 in the manner subsequently to be described, the piston 10 is urged upwardly to effect operation of the main release valve 47 and main supply valve 45 in succession to supply fluid under pressure from the supply pipe 16 to the pressure chamber 54 and the brake cylinder 13 which is constantly connected to the pressure chamber 54 through a pipe 56 and branch pipe and passage 57. When the pressure of the fluid supplied to the pressure chamber 54 substantially balances the pressure of the fluid in the control chamber 53, the operating piston 52 is shifted downwardly sufficiently to effect reseating of the main supply valve 45 without unseating the release valve 47. Thus the pressure established in the brake cylinder 13 corresponds to the pressure established in the control chamber 53.

When the fluid under pressure in the control chamber 53 is released in the manner hereinafter to be described, the higher pressure in the pressure chamber 54 shifts the operating piston 52 downwardly to effect unseating of the main release valve 47 and the consequent release of fluid under pressure from pressure chamber 54 and brake cylinder 13 to atmosphere through an exhaust passage and port 58.

Volume reservoir 19 is connected into the passage 55, as shown, to provide sufficient operating volume for the control chamber 53.

Embodied in the main casing section 35 are a magnet valve device 61, a reapplication control valve device 62, an inshot valve device 63 which is provided as a particular feature of my invention for insuring the reapplication of the brakes and operative only a certain predetermined time after the slipping of a car wheel begins, a double-check valve 64, and two one-way or check valves 65 and 66 respectively.

The magnet valve device 61 comprises a double beat valve 68 which is urged to an upper seated position by a coil spring 69 and to a lower seated position in response to energization of an electromagnet winding or solenoid 71. The double beat valve 68 is contained in a chamber 72 in the casing section 35 and with the double-beat valve 68 in its upper seated position as shown, communication is established past the lower valve seat between the chamber 72 and another chamber 73.

When the double-beat valve 68 is in its lower seated position, communication between the chambers 72 and 73 is closed and communication is opened past the upper valve seat of the valve 68 between the chamber 72 and a chamber 74 that is constantly open to atmosphere through an exhaust passage 75 containing a choke element 76 for suitably controlling the rate of exhaust of fluid under pressure therethrough.

The reapplication valve device 62 comprises a valve 78 of the poppet type and an operating piston 79 for the valve 78. The valve 78 is contained in a chamber 83 and controls communication through a port 81 in a wall 82 between the chamber 83 and a chamber 84. The valve 78 is yieldingly urged toward seated relation on an associated valve seat formed on the wall 82 by a coil spring 85 that is interposed between the valve and a screw plug closing the chamber 83.

Chamber 84 is connected by a passage 86 to a passage 87, hereafter called the supply passage, that leads to the outlet side of the filter 43 in the bracket section 31. The inlet side of the filter is connected through a passage to the control pipe 17. The chamber 83 is connected by a passage 88 containing a choke element 89 therein to the supply passage 87, and also by a branch passage 91 opening out of the passage 88, at a point between the chamber 83 and choke element 89, to the chamber 73 of the magnet valve device 61.

The operating piston 79 of the valve device 62 is annular in form and is provided with a hollow stem 93 that is closed at its outer end and provided thereon with a projecting knob 94 that extends into the chamber 84 and engages the end of the fluted stem of the valve 78. The piston 79 operates in a suitable bore 95 that opens at the face of the casing section 35 covered by the cover section 37, a portion of the gasket 38 overlapping the bore and forming a seat portion on which the piston 79 is adapted to be seated when shifted upward from the position in which it is shown. The hollow stem 93 of the piston 79 is guided in a suitable bore 96, of smaller diameter than the bore 95, that is in open communication with the chamber 84.

Formed between the piston 79 and the cover section 37 is a chamber 98 that is connected by a branch passage 99 to a passage 101 that opens into the chamber 72 of the magnet valve device 61. Formed at the opposite side of the piston 79 is an annular chamber 102 that is constantly open, through suitable grooves 103 in the stem 93 of the piston, to the chamber 84.

A coil spring 105 is interposed between the cover section 37 and the inner surface of the closed end of the piston stem 93 and normally urges the piston downwardly into seated engagement on a shoulder formed between the two bores 95 and 96, in which position the knob 94 engages the fluted stem of the valve 78 and unseats the valve 78 from its associated valve seat.

Associated with the piston 79 and contained in a chamber 106 formed in the cover section 37 is an exhaust valve 107 of the poppet type. Valve 107 is normally yieldingly urged into seated relation on an associated valve seat by a coil spring 108 that is interposed between the valve and a plug 109 screwed in the open end of the chamber 106 and having an exhaust port 110 therein. Valve 107 has a fluted stem 111 that extends through a suitable port or passage in the casing section 37 to the chamber 98 at the upper side of the piston 79 and is adapted to be engaged by the upper end of a pin 112 that is attached to or formed integrally with the closed end of the piston stem 93 and extends upwardly through the hollow stem 93. With the piston 79 in its lower position as shown, the upper end of the pin 112 has a slight clearance with respect to the end of the fluted stem 111 of the valve 107 and accordingly the valve 107 is seated. When the piston 79 is shifted upwardly, in the manner subsequently to be described, the pin 112 effects the unseating of the valve 107 and communication is thus established from the chamber 98 to the chamber 106. Fluid under pressure is thus vented from the chamber 98 to atmosphere through the exhaust port 110 in the screw plug 109.

It will be apparent that as long as the fluid pressures in the two chambers 98 and 102 at the opposite sides of piston 79 are substantially equal, the spring 109 is effective to maintain the valve 78 unseated. If the pressure of the fluid in the chamber 98 is suddenly reduced, which as will be subsequently seen is effected by operation of the magnet valve 61, the higher pressure in the chamber 102 overcomes the force of the spring 105 and shifts the piston 79 upwardly into seated relation on the seat portion of the gasket 38 so that the valve 78 is seated and the valve 107 is unseated.

With the valve 107 unseated and the piston 79 seated on the seat portion of the gasket 38, the portion of the chamber 98 within the inner seated area of the piston is constantly maintained at atmospheric pressure due to the exhaust communication past the valve 107. Thus, once the piston 79 is actuated upwardly into seated relation on the seat portion of the gasket 38, it is thereafter maintained in such position as long as the pressure of the fluid in the chamber 102 at the lower side of the piston 79 is sufficient to overcome the force of the spring 105. The spring 105 is so designed and constructed as to be ineffective to return the piston 79 to its lower seated position shown after the piston 79 is seated on the seat portion of the gasket 38, until the pressure in the chamber 102 reduces below a certain uniform low pressure such as five pounds per square inch.

As will be made more apparent hereinafter, this characteristic operation of the valve device 62 is adapted to render the choke element 89 effective to restrict the rate of resupply of fluid under pressure to the brake cylinder 13 after a wheel slip condition is relieved by release of fluid under pressure from the brake cylinder.

The inshot valve device 63 comprises a valve piston 115 that operates in a suitable bore 116 formed in the casing section 35 and opening at the face covered by the cover section 37. A coil spring 117 interposed between the valve piston 115 and the cover section 37 normally urges the valve piston inwardly of the bore 116 into seated relation on an annular gasket seat 118 suitably secured at the lower end of the bore. With the valve piston 115 seated on the gasket seat 118, the outer seated area of the valve piston is open to and subject to the fluid pressure in the supply passage 87 while the inner seated area of the valve piston is open through a suitable port 119 to a chamber 120.

Associated with the valve piston 115 is a valve 122 of the poppet type that has a fluted stem 123 which extends through the port 119 and is adapted to be engaged by the face of the valve piston 115. The valve 122 is contained in a chamber 124 and is urged toward seated relation on an associated valve seat, formed on a wall 125 separating the chambers 124 and 120, by a coil spring 126 which is interposed between the valve 122 and a plug 127 screwed in the open end of the chamber 124. The screw plug 127 has an exhaust port 128 therein and thus the chamber 124 is constantly at atmospheric pressure.

With the valve piston 115 seated on the gasket seat 118, the valve 122 is unseated against the force of the spring 126 and thus the inner seated area of the valve piston 116 is maintained at atmospheric pressure.

The chamber 131 formed in the bore 116 at the back side of the valve piston 115 is connected by a passage 132 containing a restriction or choke 133 to a branch passage 134 of the passage 101.

The chamber 131 is also connected to the volume chamber 41 in the pipe bracket section 31 of the casing by a branch passage 136 which opens out of the passage 132 at a point between the choke 133 and chamber 131. The passage 136 contains a restriction or choke 137, the purpose of which will be made apparent hereinafter.

It will be noted that one-way valve device 65 is arranged in parallel relation to the choke 133 in a manner to permit the flow of fluid under pressure from the passage 101 to the passage 132 and chamber 131 at a rapid rate and to prevent the reverse flow of fluid under pressure therepast. The one-way valve device 65 is in reality two serially related one-way valves, one of the ball valve type and the other of the spring-loaded disk type.

As will be subsequently described in greater detail, when an application of the brakes is initiated fluid under pressure is supplied simultaneously to the outer seated area of the valve piston 115 and to the chamber 131 at the back side of the valve piston, and accordingly, the spring 117 maintains the valve piston seated on the gasket seat 118. Due to the connection of the chamber 131 to the passage 101, the actuation of the double beat valve 68 of the magnet valve device 61 to its lower seated position in response to energization of the magnet winding 71 causes the venting of fluid under pressure from the chamber 131.

The capacity of the volume chamber 41 is such however in relation to the size of the choke 133 in the passage 132 as to restrict the reduction of pressure in the chamber 131 to a predetermined rate. Accordingly, the valve piston 115 is not shifted upwardly away from the gasket 118 until the pressure in the chamber 131 has reduced sufficiently in relation to the fluid pressure acting on the outer seated area of the valve piston, and such reduction does not occur until a certain uniform time, such as ten seconds, has elapsed following the beginning of the reduction of the pressure in the chamber 131. The purpose of this delayed operation of the inshot valve device 63 will be made apparent hereinafter.

When the pressure in the chamber 131 at the back side of the valve piston 115 is sufficiently reduced, the fluid pressure acting on the outer seated area of the valve piston overcomes the force of the spring 117 and starts to shift the valve piston upwardly. As the valve piston 115 moves upwardly, the valve 122 is correspondingly shifted to seated position by the spring 126 to prevent the exhaust of fluid under pressure therepast and, at the same time, the entire face of the valve piston 115 is subjected to the pressure of the fluid in the supply passage 87. Accordingly, the valve piston 115 is snapped suddenly and rapidly upwardly into seated relation on a seat portion of the gasket 38 that overhangs the opening of bore 116.

With the valve piston 115 in its upper-seated position, the supply passage 87 is connected by way of the port 119 to chamber 120.

The double-check valve device 64 is of conventional type comprising a shiftable piston valve 64a that is subject on the upper end thereof to the pressure of fluid supplied through branch passage 134 of the passage 101 and on the lower end thereof to the pressure of the fluid supplied through a passage 121 from chamber 120. In the arrangement shown, the piston valve 64a is shiftable in a vertical bore and is thus normally urged by gravity to its lower seated position. This arrangement is, however, not essential as the bore containing the piston valve 64a may be horizontal.

With the piston valve 64a in its lower seated position, a port 141 is uncovered to connect the passage 55 to the bore at the upper side of the piston valve 64a and thus communication is established between the passage 134 and the passage 55.

If the pressure of fluid supplied through passage 121 to the lower end of the piston valve 64a exceeds the fluid pressure acting on the upper end of the piston valve 64a, the piston valve is shifted upwardly to an upper seated position. In this position, port 141 is covered and a port 142 is uncovered to connect the passage 55 to the bore at the lower side of the piston valve, thus establishing communication between the passage 121 and the passage 55 while at the same time cutting off communication between the passage 134 and the passage 55.

The one-way or check-valve device 66, like the one-way valve device 65, comprises two serially related check valves, one of the ball type and the other of the disk type. Check valve device 66 is contained in the cover section 37 and is interposed in the passage 55 at a point between the port 141 of the double-check valve device 64 and the outer seated area of the valve piston of the inshot valve device 63. The arrangement of the check valve device 66 is such as to prevent the supply of fluid under pressure therepast from the supply passage 87 to the passage 55 leading to the control chamber of the relay valve mechanism while effective to permit free and rapid flow of fluid under pressure therepast in the opposite direction. The purpose of the check valve device 66 will be made more clear hereinafter and at the present time it is sufficient to state that its function is to enable the rapid release of fluid under pressure from the control chamber 53 independently of the condition of the reapplication valve device 62.

The wheel-slip responsive device 21 is illustratively shown as of one of the types disclosed and claimed in the copending application Serial No. 219,616 of Clyde C. Farmer, filed July 16, 1938, and assigned to the assignee of this application. It should be understood however that any other suitable type of wheel-slip responsive switch device may be employed.

The wheel-slip responsive device 21 is described in detail in the copending application referred to and needs no specific description herein. Briefly, however, the device comprises a fly-wheel (not shown) which is driven by rotation of the axle 11 through a resilient yielding connection that enables the fly-wheel to overrun or lag the axle 11 and thus shift forwardly or backwardly of a certain normal position. This movement of the fly-wheel relative to its normal position is adapted to effect longitudinal movement of a finger 145 which is in coaxial relation to the axis of the axle 11 to effect the engagement of two normally disengaged contact fingers 146 that are carried on an insulating block 147. The insulating block 147 is secured to a bracket 148 that is secured to the axle journal housing 149.

The construction of the wheel-slip responsive device 21 is such that when the car wheel 12 decelerates at a rate in excess of seven or eight miles per hour per second or accelerates at a rate in excess of seven or eight miles per hour per second, engagement of the contact fingers 146 is effected. In view of the fact that such a high rate of deceleration or acceleration of a car wheel is not attained unless the car wheel is slipping, It will be seen that contact fingers 146 are not actuated into engagement with each other unless the car wheel 12 slips.

The self-holding relay 24 is a conventional type of relay and, as illustrated diagrammatically, comprises a magnet winding 151 effective when energized to actuate an armature so as to shift a contact member 152 on the armature from a circuit-open to a circuit-closed position. When the magnet 151 is deenergized, the contact member 152 is biased to circuit-open position by gravity or a spring not shown.

The pressure switch 23 is of conventional type and, as diagrammatically shown, comprises a casing containing a piston 153 having a stem 164 that carries in insulated relation thereon a contact member 155. At one side of the piston 153 is a coin spring 156 which urges the piston to a lower-seated position in which the contact member 155 disengages from a pair of associated contact members 157. On the side of the piston 153 opposite the spring 156 is a chamber 158 into which the pipe 56 leading to the brake cylinder is connected.

The force of the spring 156 is such as to maintain the contact member 155 disengaged from its associated contact members 157 as long as the pressure in the brake cylinder and supplied to the chamber 158 does not exceed a certain low pressure such as fifteen pounds per square inch. When the pressure in the brake cylinder acting on the piston 153 of the pressure switch exceeds the fifteen pounds per square inch, the piston is snapped upwardly to effect engagement of the contact member 155 with its associated contact members 157. The contact member 155 is thereafter maintained in engagement with the contact members 157 as long as the pressure in the brake cylinder is sufficient to overcome the spring 156. When the pressure in the brake cylinder reduces sufficiently below fifteen pounds per square inch, the spring becomes effective to shift the piston back to its lower seated position, thus again disengaging the contact member 155 from the contact members 157.

The control circuits whereby the wheel-slip responsive device 21 controls the magnet winding 71 of the magnet valve device 61 as well as the relay 24 will be described hereinafter in connection with an assumed operation.

*Operation*

Assuming that the main reservoir 14 is suitably charged to the normal pressure carried therein by a fluid compressor not shown and that the vehicle is traveling along the road with the brake valve handle 26 in its normal release position so that the brakes are released, the operator may effect an application of the brakes by shifting the brake valve handle 26 into the application zone an amount corresponding to the desired degree of application of the brakes.

With the brake valve handle 26 in application position the control pipe 17 is charged to a pressure corresponding to the position of the brake valve handle. Fluid under pressure is accordingly supplied from the control pipe 17 through the filter 43, passages 87 and 86, chamber 84, past the unseated valve 78 of the reapplication control valve device 62, chamber 83, passage 88, passage 91, chamber 73, past the lower valve seat of the double beat valve 68 of the magnet valve device 61, passage 101, branch passage 134, port 141 of the double-check valve device 64 which is uncovered, and passage 55 to the control chamber 53 of the relay valve device.

The relay valve device is thus operated to supply fluid under pressure through the passage and pipe 57 to the brake cylinder 13 to establish a pressure therein corresponding to the pressure established in the control chamber 53. Assuming that the pressure established in the brake cylinder is of the order of twenty-five pounds per square inch, the pressure switch 23 is thus actuated to closed position in which the contact member 155 engages the contact members 157. Such operation of the pressure switch 23 is however without any immediate effect.

Since chamber 98 at the upper side of the piston 79 of the reapplication control valve device 62 is subject to the pressure in passage 101 through the branch passage 99 and since the lower face of the piston 79 is subject to a corresponding pressure in the chamber 102 which will be recalled is in open communication with the chamber 84, the spring 105 maintains the piston 79 in its lower seated position shown.

Fluid under pressure flows at a rapid rate from the passage 101 past the one-way valve device 65 and through the passage 132 to the chamber 131 at the back side of the valve piston 115 of the inshot valve device 163, at the time that fluid under pressure is being supplied to the control chamber 53. Due to the resulting rapid build-up of fluid pressure in chamber 131, the pressure of the fluid supplied simultaneously from passage 87 and acting on the outer seated area of the valve piston 115 is ineffective to unseat the valve piston. Accordingly, the exhaust valve 122 remains unseated and the lower end of the piston valve 64a of the double check valve device 64 is vented to atmosphere through the exhaust port 128 and is maintained positively in such position by the pressure of the fluid acting on the upper end of the piston valve 64a supplied through the passage 134.

The volume chamber 41 in the pipe bracket section 31, being connected to the chamber 131 in the manner previously described, is likewise charged to the pressure established in the chamber 131. In order to insure the rapid build-up of pressure in the chamber 131, the choke 137 is interposed in the passage 136 leading to the volume chamber 41 so that the relatively large volume of chamber 41 will not delay the build-up of pressure in the chamber 131. It will be apparent that the pressure in the chamber 131 must be built up sufficiently rapidly to prevent the unseating of the valve piston 115 in response to the supply of pressure through the supply passage 87 to the outer seated area of the valve piston 115.

With the brake cylinder 13 charged to the assumed pressure of twenty-five pounds per square inch, the brakes are accordingly applied to the car whels 12 with a corresponding degree of force.

If the operator desires to increase or decrease the degree of application of the brakes, he merely shifts the brake valve handle 26 farther from or nearer the normal release position to correspondingly vary the pressure in the control chamber 53 of the relay valve device, which in turn effects a corresponding variation of the pressure in the brake cylinder 13.

If the operator desires to release the brakes, he merely shifts the brake valve handle 26 to its normal release position and thus causes fluid under pressure to be vented from the control pipe 17 to atmosphere through the exhaust port and pipe 28 at the brake valve 15. It will be noted that upon a reduction of the pressure in the control pipe 17, the fluid under pressure in the control chamber 53 and the connected volume reservoir 19 may flow from the passage 55 past the one-way valve 66 to the passage 87 and then reversely through the filter 43 to the control pipe 17, thus assuring the rapid reduction of the pressure in the control chamber 53 of the relay valve mechanism in correspondence with the reduction of the pressure in the control pipe 17.

As long as the reapplication control valve device 62 remains in the position shown, with the valve 78 unseated, fluid under pressure may also flow reversely from the control chamber 53 of the relay valve device through the pipe 55, port 141 of the double-check valve device 64, passages 134 and 101 past the lower valve seat of the double beat valve 68 of the magnet valve device 61, chamber 73, passages 91 and 88, chamber 83, past the unseated valve 78, chamber 84, passages 86 and 87, and through the filter 43 to the control pipe 17.

With the pressure in the control chamber 53 of the relay valve device reduced to atmospheric pressure, the fluid under pressure in the brake cylinder 13 is correspondingly vented to atmosphere through the exhaust passage 58 of the relay valve device.

If the degree of application of the brakes effected in the manner above described is such that the car wheel 12 begins to slip, a further operation of the control valve mechanism 18 occurs due to the energization of the magnet winding 71 of the magnet valve device 61 in response to the engagement of the contact fingers 146 of the wheel-slip responsive device 21. The engagement of the contact fingers 146 of the wheel-slip responsive device 21 completes a circuit for energizing the magnet winding 71 of the magnet valve device 61 and the magnet winding of the relay 24. This circuit extends from one terminal of the battery 22, hereinafter referred to as the positive terminal, by way of a wire 161, a branch wire 162, the contact fingers 146, and a wire 163 to the point 164, where the circuit divides into two parallel branches, one branch extending by way of the wire 163 and magnet winding 71 of the magnet valve device 61 to the negative terminal of the battery 22 as through a ground connection indicated, and the other branch extending from the point 164 by way of a branch wire 165, magnet winding 151 of relay 24, and to the negative terminal of the battery 22 as through a ground connection indicated.

Once the relay 24 is energized and its contact member 152 actuated to closed position, a holding circuit is established for maintaining the magnet winding 151 of the relay 24, as well as the magnet winding 71 of the magnet valve device 61, energized thereafter independently of the wheel-slip responsive device 21.

The holding circuit just referred to extends from the positive terminal of the battery 22 by way of the wire 161, contact members 157 and 155 of pressure switch 23, a wire 167, contact member 152 (now closed) of relay 24, and then through two parallel branches, one of which includes the magnet winding of the relay 24 and the other of which includes the wires 165 and 164 and the magnet winding 71 of the magnet valve 61, both branch circuits returning to the negative terminal of the battery 22 in the manner previously described.

When the magnet winding 71 of the magnet valve device 61 is energized in the manner just described, the double beat valve 68 is operated to its lower seated position to cut off the communication previously described through which fluid under pressure is supplied to the control chamber 53 of the relay valve device and at the same time establish communication through which fluid under pressure is rapidly vented from the control chamber 53. This exhaust communication extends from the control chamber 53 through the passage 55, port 141 of the double-check valve device 164, passages 134 and 101, chamber 72 of the magnet valve device 61, past the upper valve seat of the double beat valve 68, chamber 74, passage 75 and to atmosphere through the choke element 176. Choke element 176 is of such size in relation to the combined volume of the control chamber 53 and volume reservoir 19 as to effect a rapid reduction of the pressure in the control chamber 53.

At the same time, fluid under pressure is also exhausted from the chamber 98 above the piston 79 of the reapplication control valve device 62 due to the connection between the chamber 98 and the passage 101 through branch passage 99. The piston 79 is accordingly shifted suddenly and positively to the upper seated position on the seat portion of the gasket 38 and thus unseats the valve 107 and seats the valve 78. Assuming a pressure such as twenty-five pounds per square inch to have been established in the control pipe 17, the piston 79 is, as previously explained, thereafter maintained in its upper seated position.

The exhaust of fluid under pressure from the control chamber 53 of the relay valve device through passage 134 also causes a reduction of the fluid pressure in the chamber 131 of inshot valve device 63 and the connected volume chamber 41. The choke 133 in the passage 132 restricts the rate of exhaust of the fluid under pressure from the chamber 131 and volume chamber 41 to passage 134 and thus valve piston 115 of the inshot valve device 63 is not immediately shifted upwardly to its upper seated position.

Upon the rapid reduction of the pressure in the control chamber 53 of the relay valve device, the relay valve device is correspondingly operated to rapidly exhaust fluid under pressure from the brake cylinder 13 through the exhaust passage and port 58. This reduction of the pressure in the brake cylinder 13 is effected so rapidly in response to the initiation of the slipping of the wheel 12 that the wheel does not decelerate completely to a locked or non-rotative state but promptly ceases to decelerate and begins to accelerate back toward a rotative speed corresponding to the speed of the vehicle.

The purpose of the holding circuit should now be apparent for, when the car wheel 12 changes from deceleration to acceleration, the contact fingers 146 of the wheel-slip responsive device 21 are momentarily opened and thus deenergization of the magnet winding 71 of the magnet valve device 61 would be effected except for the holding circuit. It will thus be apparent that as long as the pressure switch 23 remains closed, the magnet winding 71 of the magnet valve 61 remains energized and fluid under pressure continues to be exhausted from the control chamber 53 of the relay valve device so that the fluid under pressure in the brake cylinder correspondingly continues to be exhausted.

When the pressure in the brake cylinder 13 is reduced sufficiently to cause the pressure switch 23 to open the holding circuit for the magnet valve device 61 and relay 24, the magnet winding 71 of the magnet valve device 61 becomes deenergized so that the double beat valve 68 of the magnet valve device 61 is correspondingly returned to its upper-seated position closing the exhaust communication and reestablishing the communication through which fluid under pressure is supplied to the control chamber 53 of the relay valve device.

Due to the fact that the piston 79 of the reapplication control valve device 62 is pneumatically "stuck" or maintained in its upper seated position, however, the valve 78 remains seated and thus prevents the supply of fluid under pressure therepast from the supply passage 87 to the chamber 73 of the magnet valve device 61. Accordingly, fluid under pressure is resupplied from the supply passage 87 to the control chamber 53 of the relay valve device only by way of the portion of passage 88 including the choke 89, branch passage 91, chamber 73 of the magnet valve device 61, and thence past valve 68, through the passages 101 and 134, port 141 of the double-check valve device 64, and passage 55.

It will thus be seen that once the car wheel 12 begins to slip, the rate of resupply of fluid under pressure to the control chamber 53 of the relay valve device is restricted to a rate determined by the flow area of the choke element 89. As a result of the restricted rate of resupply of fluid under pressure to the control chamber 53 of the relay valve device, the pressure in the brake cylinder 13 is correspondingly restored at a restricted or slower rate and, depending upon the flow area of the choke element 89, may or may not be restored to the initial pressure which caused the car wheels to begin to slip, before the car or train is completely stopped. The flow area of choke element 89 is preferably of such size that the pressure established in the control pipe 17 is not restored in the control chamber 53 of the relay valve device until after the car is brought to a complete stop. Thus, since the pressure in the brake cylinder is correspondingly not restored to the degree sufficient to cause slipping of the car wheel 12, a recurrence of wheel slipping is unlikely.

It should be understood that the reduction of the pressure in the brake cylinder 13 to a value sufficient to open the pressure switch 23 does not occur until after the car wheel has returned fully to a rotative speed corresponding to vehicle speed and thus, when the pressure switch 23 does open, the wheel-slip responsive switch device 21 is ineffective to close the initial circuit for energizing the magnet valve device 61 and the relay 24 because the contact fingers 146 thereof are separated. The fact that the brake cylinder pressure is not reduced sufficiently to open the pressure switch 23 until after the slipping wheel returns fully to a rotative speed corresponding to vehicle speed accordingly prevents the resupply of fluid under pressure to the brake cylinder and consequently the reapplication of the brakes prior to the restoration of the car wheels to a rotative speed corresponding to vehicle speed. Thus the possibility of recurrence of wheel slipping of the car wheel 12 is rendered further unlikely because the reapplication of the brakes thereon cannot be initiated while the car wheel is slipping and rotating at a relatively low speed.

The time interval which elapses from the time that the car wheel begins to slip until it is restored fully to a rotative speed corresponding to vehicle speed following the release of the brakes in the manner just described is of the order of two or three seconds. If for some reason, such as the sticking of the double beat valve 68 of magnet valve device 61 in its lower seated position notwithstanding deenergization thereof, the resupply of fluid under pressure to the control chamber 53 of the relay valve device and consequently the resupply of fluid under pressure of the brake cylinder 13 does not take place within such interval of time, the continued reduction of the pressure in the chamber 131 and the connected volume chamber 41 causes the valve piston 115 of the inshot valve device 63 to be shifted upwardly to its upper seated position in which fluid under pressure is supplied directly from the supply passage 87 to the lower end of the piston valve 64a of the double check valve device 64. Since the pressure in the passage 134 and connected passage 101 is relatively low due to the exhaust communication through the choke 76, the higher pressure supplied to the lower end of the piston valve 64a of the double check valve device 64 shifts the piston valve upwardly to uncover the port 142 and close the port 141. Thus the piston valve 64a is operated to close the exhaust communication from the passage 55 and the control chamber 53 of the relay valve device and, at the same time, establish a supply communication through which fluid under pressure is supplied directly from the supply passage 87 past the unseated valve piston 115 of the inshot valve device 63 and through the port 142 of the double check valve device 64 to the passage 55, thus causing the fluid pressure in the control chamber 53 of the relay valve device to be rapidly restored to the pressure established in the control pipe 17. The relay valve device correspondingly operates to immediately build up the pressure in the brake cylinder 13 to reapply the brakes on the car wheel 12.

It will thus be seen that if the magnet valve device 61 operates properly in response to deenergization of its magnet winding 71, the inshot valve device 63 is not operated because the pressure in the chamber 131 at the back of the valve piston 115 of the inshot valve device 63 begins to be built up again before being reduced sufficiently to cause upward movement of the valve piston to its upper seated position. The inshot valve 63 is operative, therefore, to insure the resupply of fluid under pressure to the brake cylinder following release caused by a slipping of the car wheel only in the event that the magnet valve device 61 does not operate properly to effect such resupply.

The inshot valve device 63 functions also upon the initial application of the brakes if the double beat valve 68 of the magnet valve device 61 happens to be stuck in its lower seated position preventing the supply of fluid under pressure therepast from the supply passage 87 to the control chamber 53 of the relay valve device. It will be apparent that this is so because if fluid pressure is not built up in the chamber 131 due to the double beat valve 68 of the magnet valve 61 being stuck in the lower seated position, the fluid under pressure supplied to the outer-seated area of the valve piston 115 from the passage 87 unseats the valve piston and thus causes fluid under pressure to be supplied from the passage 87 to passage 55 and thus to the control chamber 53 of the relay valve device independently of the magnet valve device 61.

As previously stated, the delay in effecting reapplication of the brakes following slipping of the car wheel 12 as well as the restoration of the brake cylinder pressure at a restricted rate renders unlikely a recurrence of wheel slipping. If, however, the car wheel 12 should again begin to slip following the reapplication of the brakes, the magnet valve device 61 is again operated to exhaust fluid under pressure from the control chamber 53 of the relay valve device to effect a corresponding reduction of the pressure of the brake cylinder 13 and, after the brake cylinder pressure reduces sufficiently to open pressure switch 23, to effect reapplication of the brakes at the restricted rate. In this instance, however, the piston 79 of the reapplication control valve 62 is not operated since it has remained in its upper seated position due to the previous slipping of the wheel.

It will thus be apparent that although the reapplication of the brakes effected in response to the operation of the inshot valve device 63 is not at a restricted rate, nevertheless constant protection against the sliding of the wheel is maintained and at no time can the car wheel attain a locked or sliding state.

When the vehicle comes to a stop in response to an application of the brakes during which slipping of the car wheel 12 occurs, the brakes may be released, prior to again starting the vehicle, by shifting the brake valve handle 26 to its normal brake release position. In this instance, assuming that the inshot valve 63 has not operated, fluid under pressure would be released from the control chamber 53 of the relay valve device only at a restricted rate determined by the flow area of choke element 89 except for the one-way valve 66. The one-way valve 66 permitting, as it does, the direct flow of fluid under pressure from the passage 55 to the passage 87 independently of the seated position of the valve 78 of the reapplication control valve device 63 permits a normal rate of release of the brakes and prevents an unduly long release time.

If the inshot valve device 63 has been operated, fluid under pressure may be rapidly released from the control chamber 53 through the passage 55 to the passage 87 past the unseated valve piston 115 of the inshot valve 63 until such time as the pressure in the passage 87 reduces sufficiently to permit the spring 117 to shift the valve piston 115 to its lower seated position on the gasket seat 118. Thereafter, except for the one-way valve 66, the only release communication would be by way of the choke 89. Thus the one-way valve 66 is also effective in such instance to enable a normal release time.

With the double beat valve 68 of the magnet valve 61 improperly held in its lower seated position after the valve piston 115 of the inshot valve device 63 is reseated on the gasket seat 118, a certain amount of pressure would remain trapped in the control chamber 53 of the relay valve mechanism so that a corresponding pressure would remain in the brake cylinder 13. Thus the brakes might remain applied to a certain degree and drag. In this instance, however, the one-way valve 66 enables the complete venting of fluid under pressure from the control chamber 53 and thus prevents dragging of the brakes.

*Summary*

Summarizing, it will be seen that I have disclosed a vehicle brake control equipment including a wheel-slip responsive device and a control valve mechanism that is effective under the control of the wheel-slip responsive device, when a wheel begins to slip, to initiate a rapid reduction of the pressure in the brake cylinder applying the brakes on the slipping wheel and, thereafter, to effect reapplication of the brakes on the slipping wheel at a restricted rate only when the pressure in the brake cylinder reduced below a certain low value, which amount of reduction does not occur until after the slipping wheel has been again restored to a rotative speed corresponding to vehicle speed.

According to my invention, the equipment disclosed further includes a so-called inshot valve device which is effective to insure a reapplication of the brakes if a certain time, such as six seconds elapses after a wheel begins to slip without operation of the control valve mechanism in its accustomed manner to effect the reapplication of the brakes. The inshot valve device is also effective in the event of sticking of certain valve parts of the control valve mechanism to insure an application of the brakes when first initiated.

While I have illustrated and described my invention in connection with a single pair of wheels, the manner in which it may be adapted to the control of all the pairs of wheels on a car or train will be readily apparent. Also, various omissions, additions and modifications may be made in the specific embodiment shown without departing from the spirit of my invention. It is accordingly not my intention to limit the scope of my invention except as it is necessitated by the scope of the prior art.

Having now described my invention, what I claim as new and desire to secure by Letters Patent is:

1. Vehicle brake control apparatus comprising, in combination, manually operated means for controlling the application and release of the brakes associated with the wheels of the vehicle, means operatively responsive to slipping of a vehicle wheel, means controlled by the wheel-slip responsive means for automatically effecting a rapid release of the brakes associated with the wheel independently of the manually operated means when the wheel begins to slip and effective thereafter, in its normal manner of operation, to initiate the reapplication of the brakes on the wheel within a certain length of time following the instant the wheels begin to slip, and means automatically effective to initiate reapplication of the brakes on the wheel in the event that the last said means fails to initiate reapplication within said certain length of time.

2. Vehicle brake control apparatus comprising, in combination, manually operated means for controlling the application and release of the brakes associated with the wheels of the vehicle, means operatively responsive only to the changes in rotative speed of a vehicle wheel at a rate in excess of a certain rate, means controlled by the last said means for automatically effecting release of the brakes associated with the wheels independently of the manually operated means when the wheel begins to decelerate at a rate in excess of said certain rate and effective thereafter, in its normal manner of operation, to initiate reapplication of the brakes on the wheel within a certain length of time following the instant the wheel begins to decelerate in excess of said certain rate, and means automatically effective to initiate reapplication of the brakes on the wheel in the event of failure of the last said means to initiate reapplication of the brakes within said certain length of time.

3. Vehicle brake control apparatus comprising, a combination, manually operated means controlling the application and release of the brakes associated with the wheels of the vehicle, means operatively responsive to the slipping of a vehicle wheel, means set in operation under the control of the last said means when the vehicle wheel begins to slip for automatically effecting a rapid release of the brakes on the wheel independently of the manually operated means and thereafter, in its normal manner of operation, initiating reapplication of the brakes on the wheel only after the application of the brakes has been reduced below a certain degree, and means effective upon the expiration of a certain uniform time after the instant the wheel begins to slip, to initiate reapplication of the brakes on the wheel in the event that the last said means fails to initiate reapplication of the brakes within said certain time.

4. Vehicle brake control apparatus comprising, in combination, means providing a chamber, means effective in accordance with the fluid pressure established in said chamber for effecting a corresponding degree of application of the brakes on a wheel of the vehicle, means providing a communication through which fluid under pressure is supplied to said chamber and released therefrom, valve means normally effective to permit fluid under pressure to be supplied through the communication to said chamber and operative to a different position to prevent the supply of fluid under pressure through the communication to the said chamber and at the same time to vent fluid under pressure from said chamber to effect a reduction of pressure therein resulting in a release of the brakes, means effective when a wheel begins to slip to cause operation of said valve means to its said different position and effective when the application of the brakes has been reduced below a certain degree to cause restoration of said valve means to its normal position, a valve device operative to supply fluid under pressure to the said chamber independently of the said valve means, and means for causing operation of said valve device to supply fluid under pressure to the said chamber if said valve means remains in its said different position longer than a certain length of time.

5. Vehicle brake control apparatus, comprising in combination, means providing a chamber, means effective according to the fluid pressure established in said chamber for causing application of the brakes on a wheel of the vehicle to a degree corresponding to the pressure in said chamber, means providing a communication adapted to be charged with fluid at a pressure corresponding to a desired degree of application of the brakes, valve means effective normally in one position to permit fluid under pressure to flow from said communication to said chamber and operative to a different position to prevent the flow of fluid under pressure from said communication to said chamber and at the same time to exhaust fluid under pressure from said chamber, a valve device including a movable abutment adapted to be subject on one side to the pressure in said communication and on its other side to the pressure in said chamber, said valve means being effective in its said different position to cause a reduction of the pressure on the other side of said valve device, and means for so controlling the rate of reduction of the pressure acting on the said other side of the abutment of said valve device as to cause movement of the said abutment resulting in operation of the said valve device to establish a communication through which fluid under pressure is supplied to said chamber from said communication independently of the valve means upon the expiration of a predetermined time after the reduction of pressure begins if the said valve means is not sooner restored to its normal position.

6. Vehicle brake apparatus comprising, in combination, means providing a chamber, means effective in accordance with the fluid pressure established in said chamber for causing application of the brakes on a wheel of the vehicle to a degree corresponding to the pressure in the chamber, means providing a communication adapted to be charged with fluid at a pressure corresponding to a selected degree of application of the brakes, valve means normally in a position to permit fluid under pressure to be supplied from said communication to the said chamber and operative to a different position to prevent the supply of fluid under pressure from said communication to said chamber and at the same time vent fluid under pressure from said chamber, a valve device having a normal position preventing the supply of fluid under pressure from said communication to said chamber and operative to a different position to cause fluid under pressure to be supplied from said communication to said chamber, means effective when a vehicle wheel begins to slip for causing operation of said valve means to its said different position and effective, when the pressure in said chamber reduces below a certain degree, to restore the said valve means to its said one position so that fluid under pressure may be resupplied to the said chamber to effect reapplication of the brakes, and means effective to cause operation of the said valve device to its said different position to cause fluid under pressure to be resupplied to said chamber to effect reapplication of the brakes upon the expiration of a certain time after the wheel begins to slip in the event that the said valve means is not sooner restored to its said one position.

7. Vehicle brake apparatus comprising, in combination, means providing a chamber, means effective in accordance with the fluid pressure established in said chamber for causing application of the brakes on a wheel of the vehicle to a degree corresponding to the pressure in the chamber, means providing a communication adapted to be charged with fluid at a pressure corresponding to a selected degree of application of the brakes, valve means normally in a position to permit fluid under pressure to be supplied from said communication to the said chamber and operative to a different position to prevent the supply of fluid under pressure from said communication to said chamber and at the same time vent fluid under pressure from said chamber, a valve device having a normal position preventing the supply of fluid under pressure from said communication to said chamber and operative to a different position to cause fluid under pressure to be supplied from said communication to said chamber, means effective when a vehicle wheel begins to slip for causing operation of said valve means to its said different position and effective when the pressure in said chamber reduces sufficiently to cause the application of the brakes to reduce below a certain degree for restoring the said valve means to its said one position so that fluid under pressure may be resupplied to the said chamber to effect reapplication of the brakes, and a double-check valve device selectively establishing communication through which fluid under pressure is supplied to said chamber under control of either said valve means or said valve device.

8. Vehicle brake apparatus comprising, in combination, means providing a chamber, means effective in accordance with the fluid pressure established in said chamber for causing application of the brakes on a wheel of the vehicle to a degree corresponding to the pressure in the chamber, means providing a communication adapted to be charged with fluid at a pressure corresponding to a selected degree of application of the brakes, valve means normally in a position to permit fluid under pressure to be supplied from said communication to the said chamber and operative to a different position to prevent the supply of fluid under pressure from said communication to said chamber and at the same time vent fluid under pressure from said chamber, a valve device having a normal position preventing the supply of fluid under pressure from said communication to said chamber and operative to a different position to cause fluid under pressure to be supplied from said communication to said chamber, means effective when a vehicle wheel begins to slip for causing operation of said valve means to its said different position and effective when the pressure in said chamber reduces sufficiently to cause the application of the brakes to reduce below a certain degree for restoring the said valve means to its said one position so that fluid under pressure may be resupplied to the said chamber to effect reapplication of the brakes, and a one-way valve interposed between the said chamber and said communication in such a manner as to permit the flow of fluid under pressure directly from said chamber to said communication in response to a reduction of pressure in said communication, independently of said valve means or said valve device.

9. Vehicle brake control apparatus comprising, in combination, means providing a chamber adapted to be charged with fluid under pressure, means effective to cause application of the brakes on a vehicle wheel to a degree corresponding with the fluid pressure established in the chamber, means providing a communication through which fluid under pressure is supplied to said chamber and released therefrom, a magnet valve device effective when deenergized to permit fluid under pressure to be supplied to said communication and operative to a different position, when energized, in which it prevents the supply of fluid under pressure through the communication to said chamber and at the same time vents fluid under pressure from said chamber, a relay, a pressure switch controlled according to the pressure in said chamber and operative to a closed position only so long as pressure in the said chamber exceeds a certain pressure, and a switch device operative to a closed position when a vehicle wheel begins to slip for causing energization of said magnet valve device and said relay, said relay and said pressure switch being jointly effective to maintain said magnet valve device and said relay energized independently of said switch device until said pressure switch opens in response to the reduction of pressure in said chamber caused by energization of the magnet valve device.

DONALD L. McNEAL.